(12) United States Patent
Wei et al.

(10) Patent No.: US 11,141,854 B2
(45) Date of Patent: Oct. 12, 2021

(54) CUTTING MAT ASSEMBLY AND METHOD FOR MAKING THE SAME

(71) Applicant: YING SIN CO., LTD., Changhua County (TW)

(72) Inventors: Jun Gyen Wei, Changhua County (TW); Ya Ting Chen, Changhua County (TW)

(73) Assignee: Ying Sin Co., Ltd., Changhua County (TW)

( * ) Notice: Subject to any disclaimer, the term of this patent is extended or adjusted under 35 U.S.C. 154(b) by 155 days.

(21) Appl. No.: 16/519,431

(22) Filed: Jul. 23, 2019

(65) Prior Publication Data
US 2020/0047325 A1 Feb. 13, 2020

(30) Foreign Application Priority Data

Aug. 8, 2018 (TW) ................ 107127684

(51) Int. Cl.
*B25H 1/12* (2006.01)
*A47B 21/03* (2006.01)
*A47J 47/00* (2006.01)

(52) U.S. Cl.
CPC ............... *B25H 1/12* (2013.01); *A47B 21/03* (2013.01); *A47J 47/005* (2013.01)

(58) Field of Classification Search
CPC .. B25H 1/04; B25H 1/12; A47B 37/00; A47B 97/02; A47B 21/03; A47J 47/00; A47J 47/005; B26D 7/20
USPC ................................................ 269/16
See application file for complete search history.

(56) References Cited

U.S. PATENT DOCUMENTS

| 5,501,441 | A | * | 3/1996 | Kegley | ................ | A47J 47/005 |
| | | | | | | 269/13 |
| 6,742,429 | B2 | * | 6/2004 | Chen | ................ | A47J 47/005 |
| | | | | | | 269/289 R |
| 2011/0104425 | A1 | * | 5/2011 | Chen Lin | ................ | B26D 7/20 |
| | | | | | | 428/58 |

OTHER PUBLICATIONS

STIC Search Results (Year: 2021).*

* cited by examiner

*Primary Examiner* — Michael D Jennings
*Assistant Examiner* — Alberto Saenz
(74) *Attorney, Agent, or Firm* — Rosenberg, Klein & Lee

(57) ABSTRACT

A method for making a cutting mat assembly includes a step of arranging two mats side-by-side and a assembling line being formed along two respective first sides of the two mats, each mat including a first slot or a first handle formed to a second side thereof; and a step of arranging an inner piece located between the two mats and a second slot or a second handle being formed to each of two opposite ends of the inner piece, the first handles of the two mats respectively extending through the two second slots of the inner piece, or the two second handles of the inner piece respectively extending through the two first slots such that the two mats are located corresponding to one face of the inner piece. The users hold the handles to carry the cutting mat assembly, and tools are stored by the inner piece.

4 Claims, 10 Drawing Sheets

B a
a step of
ssembling mats b
a step of
forming an inner piece c
a step of
connecting a connection piece

CUTTING MAT ASSEMBLY AND METHOD FOR MAKING THE SAME

BACKGROUND OF THE INVENTION

1. Fields of the Invention

The present invention relates to a cutting mat assembly and a method for making the cutting mat assembly, wherein the cutting mat assembly includes two mats with a connection piece connected between so as to store tools between the two mats.

2. Descriptions of Related Art

The conventional cutting mats are usually made by the material that is slightly flexible and durable, and users can use knives to work on the mat so as to protect the desk top. However, the conventional cutting mats only include one single function and the tools such as knives, rulers, pencils or the like have to be prepared independently. In other words, the users have to prepare or collect the cutting mats and the tools when needed, and this wastes time.

The present invention intends to provide a cutting mat assembly and a method for making the cutting mat assembly, the tools can be stored or collected in the cutting mat assembly.

SUMMARY OF THE INVENTION

The present invention relates to a method for making a cutting mat assembly, and the method comprises the following steps:

a step of assembling mats: arranging two mats side-by-side, two respective first sides of the two mats contacting each other, an assembling line formed along the two respective first sides of the two mats, each mat including a first slot or a first handle formed to a second side thereof, and a step of forming an inner piece: an inner piece located between the two mats, a second slot or a second handle formed to each of two opposite ends of the inner piece, the first handles of the two mats respectively extending through the two second slots of the inner piece, or the two second handles of the inner piece respectively extending through the two first slots such that the two mats are located corresponding to one face of the inner piece.

Preferably, the assembling line is a straight line, a curved line or a continuous wave-shaped line.

Preferably, the method further including a step of connecting a connection piece, wherein the connection piece is secured to the two mats and covers the assembling line.

Preferably, the connection piece includes a third slot formed in a middle portion thereof.

The present invention also provides a cutting mat assembly which comprises a mat unit including two mats, and two respective first sides of the two mats contact each other. An assembling line is formed along the two respective first sides of the two mats. Each mat includes a first slot. An inner piece is located between the two mats. A second handle is formed to each of two opposite ends of the inner piece. The two second handles of the inner piece respectively extend through the two first slots such that the two mats are located corresponding to one face of the inner piece.

Preferably, the assembling line is a straight line, a curved line or a continuous wave-shaped line.

Preferably, a connection piece is secured to the two mats and covers the assembling line.

Preferably, the connection piece includes a third slot formed in the middle portion thereof.

Preferably, the two mats each include printed marks on the outside thereof.

Preferably, a second slot is formed to each of two opposite ends of the inner piece. Each mat includes a first handle formed to the second side thereof. The first handles of the two mats respectively extend through the two second slots of the inner piece.

The primary object of the present invention is to provide a cutting mat assembly with handles and an inner piece so that the users can easily carry the cutting mat assembly. The inner piece may have pockets to store tools. The mats are used for protecting desk tops.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 6:
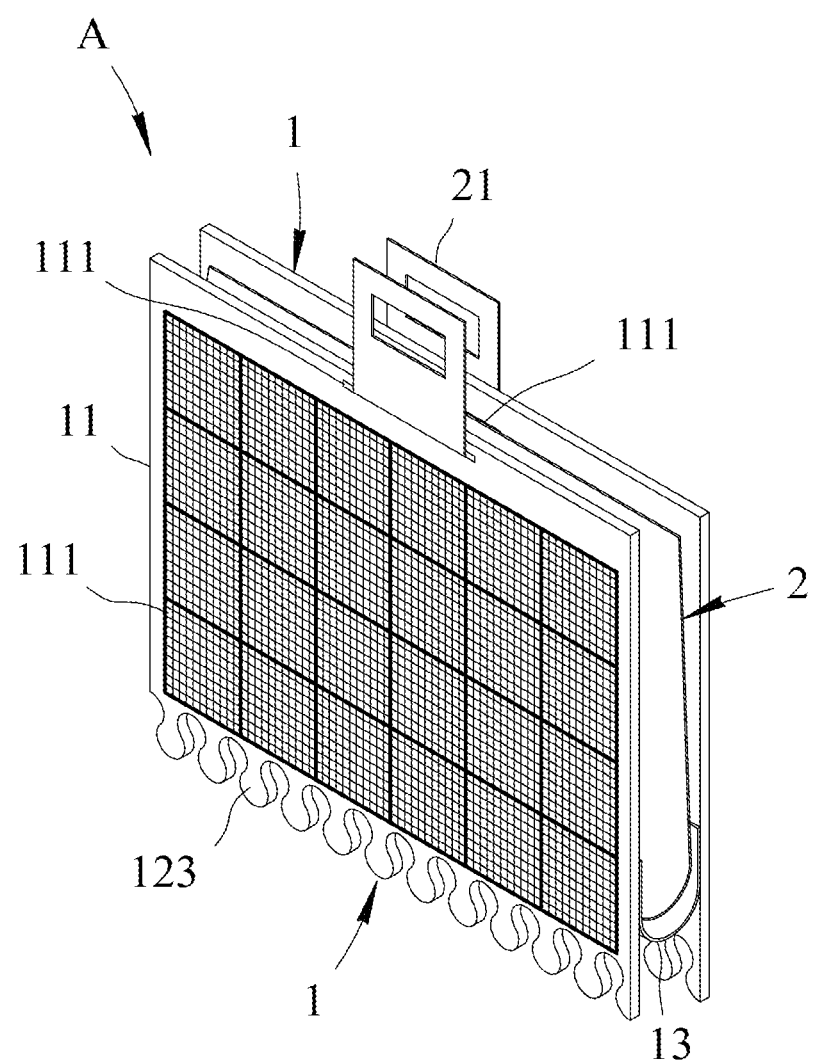
FIG. 6 is a perspective view to show the fourth embodiment of the cutting mat assembly of the present invention.
Figure 7:
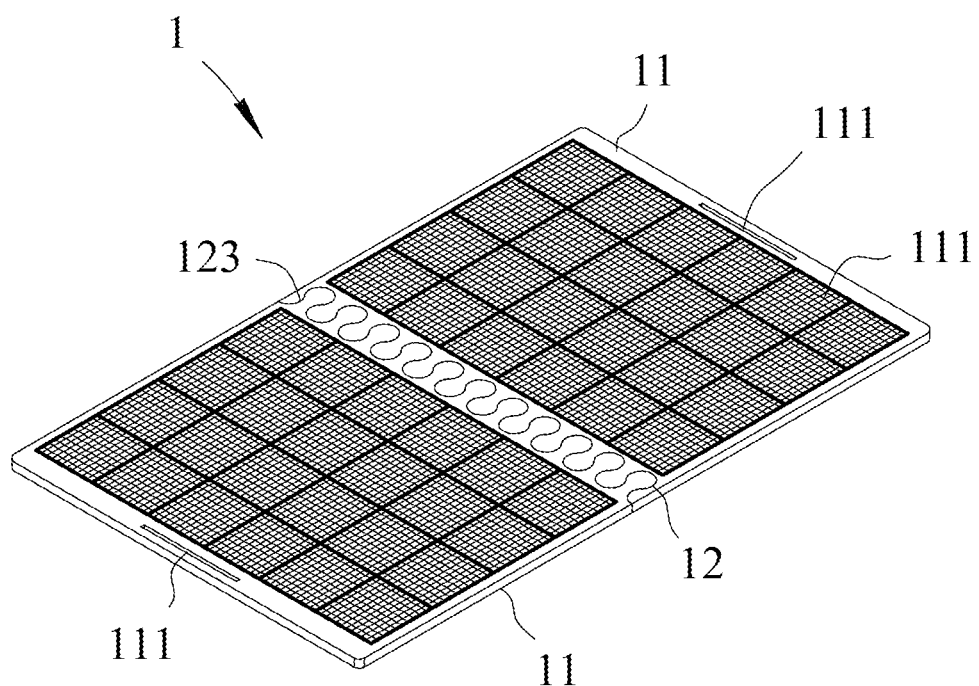
FIG. 7 shows that the fourth embodiment of the cutting mat assembly of the present invention is expanded.
Figure 8:
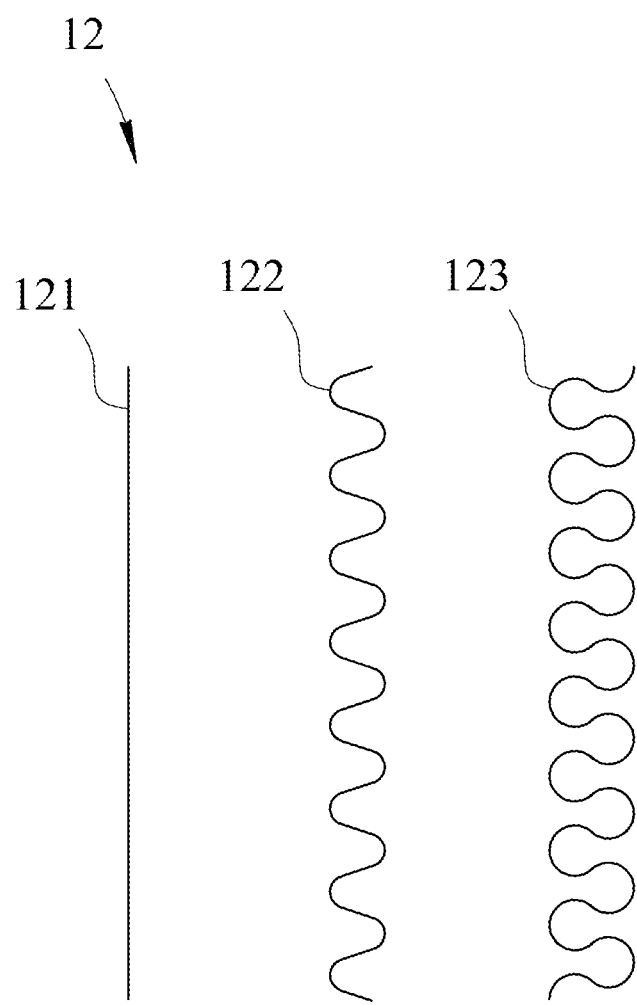
FIG. 8 shows the different assembling lines in the previous embodiments.

Referring to FIGS. 1 to 9, the cutting mat assembly "A" of the present invention comprises a mat unit 1 including two mats 11, and each mat 11 is a rectangular mat and includes a first side and a second side. The two mats 11 are put side-by-side, so that the two respective first sides of the two mats 11 contact each other, and an assembling line 12 is formed along the two respective first sides of the two mats 11. The assembling line 12 is a straight line 121, a curved line 122 or a continuous wave-shaped line 123 as shown in FIG. 8. Each mat 11 includes a first slot 111 formed to the second side thereof. The two mats 11 each include printed marks 112 on the outside thereof, and the printed marks 112 can be dots, straight lines, inclined liens or curved lines.

An inner piece 2 is located between the two mats 11, and a second handle 21 is formed to each of two opposite ends of the inner piece 2. The inner piece 2 is folded to be put between the two mats 11. The two second handles 21 of the inner piece 2 respectively extend through the two first slots 111 such that the two mats 11 are located corresponding to one face of the inner piece 2. The inner piece 2 may have pockets or the like so as to store tools in the pockets.

Figure 1:
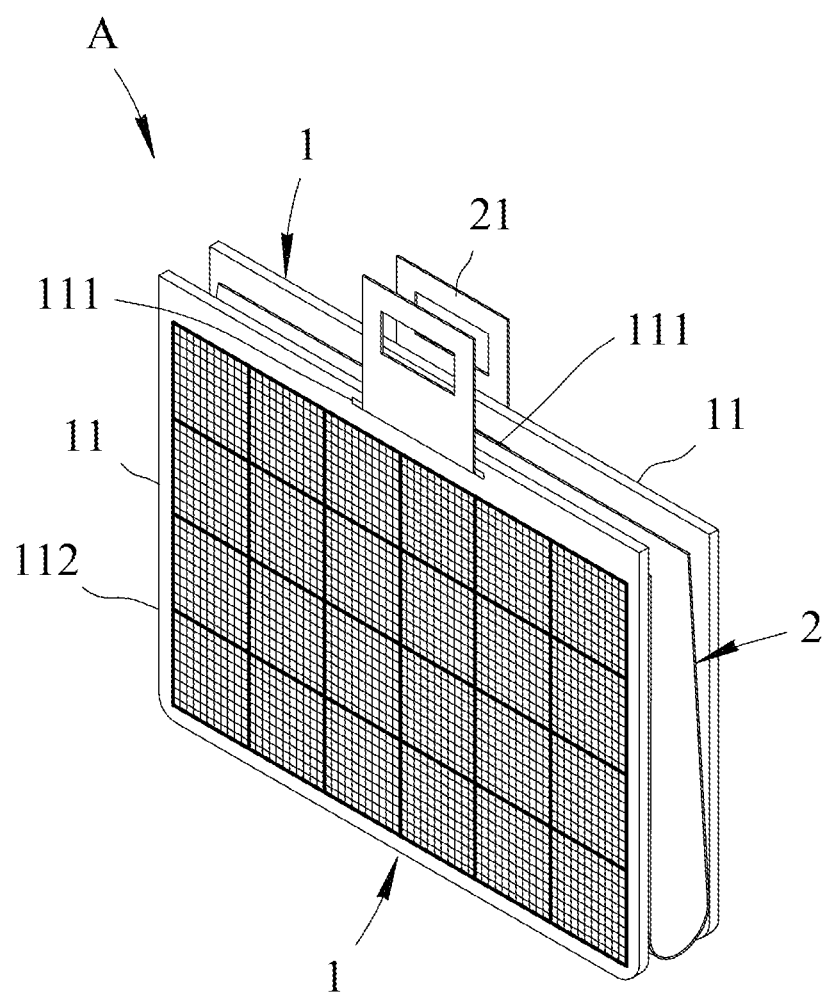
FIG. 1 is a perspective view to show the cutting mat assembly of the present invention.
Figure 2:
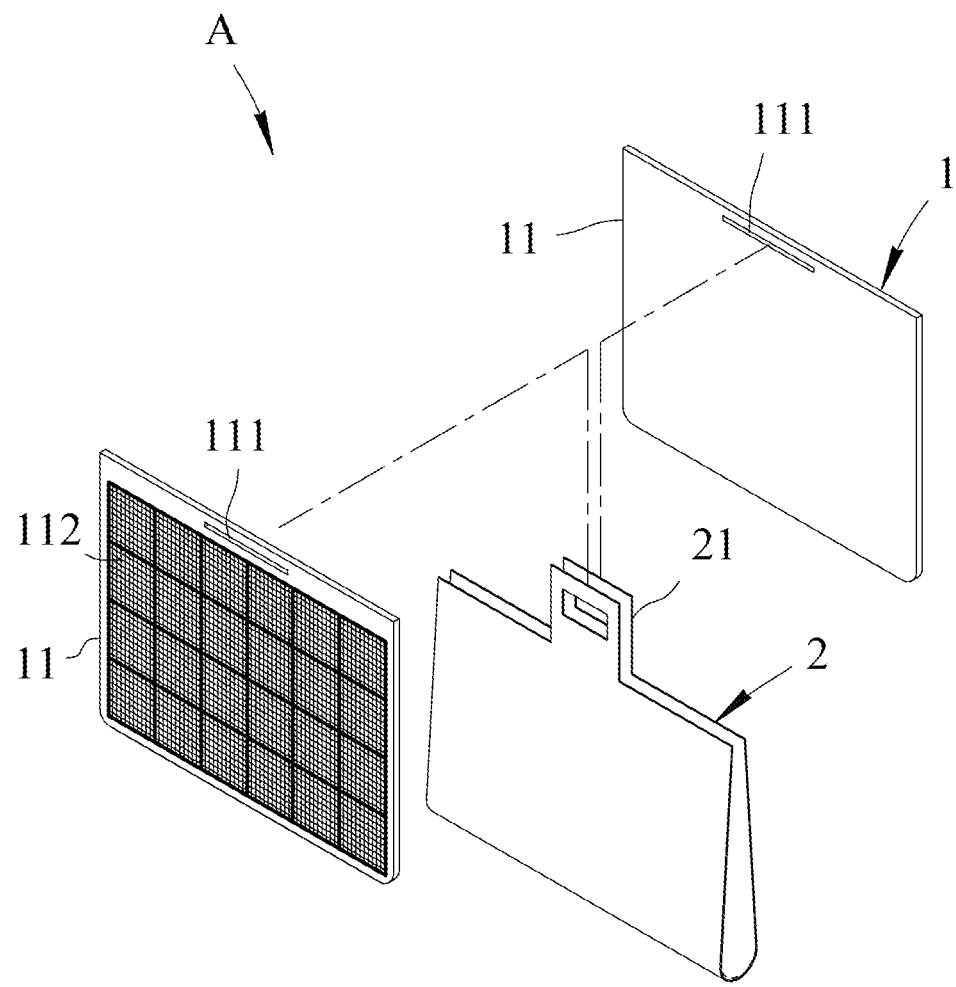
FIG. 2 is an exploded view of the cutting mat assembly of the present invention.
Figure 3:
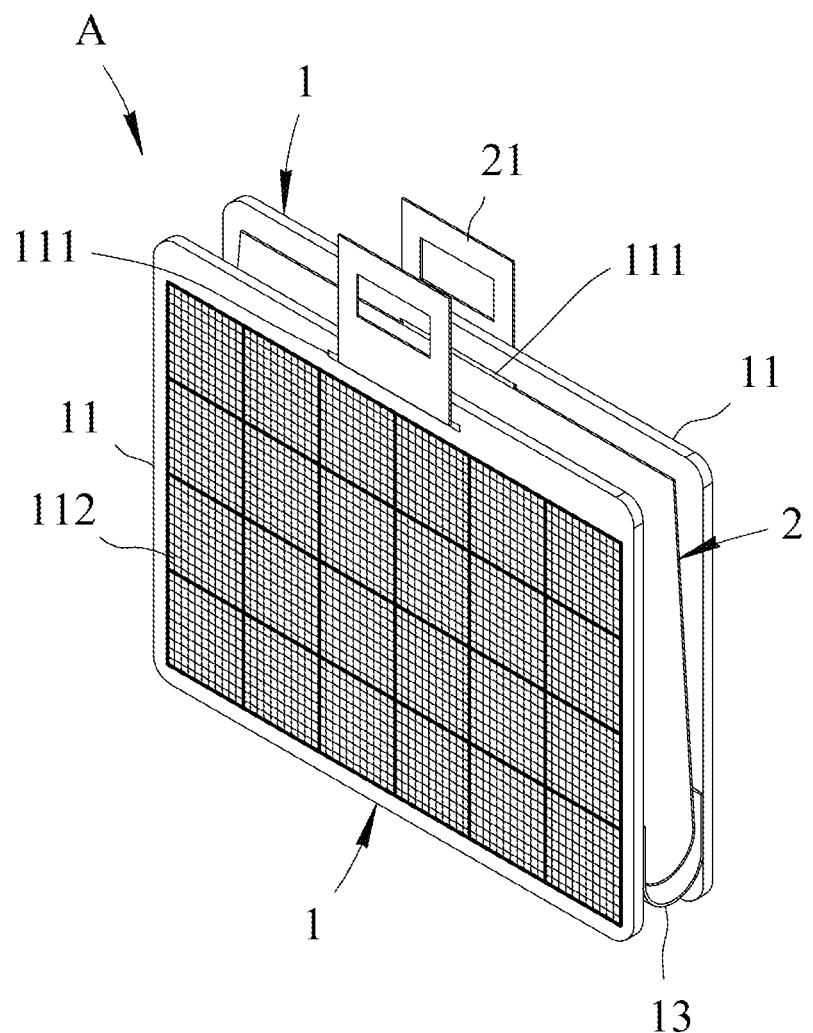
FIG. 3 is a perspective view to show the second embodiment of the cutting mat assembly of the present invention.
Figure 4:
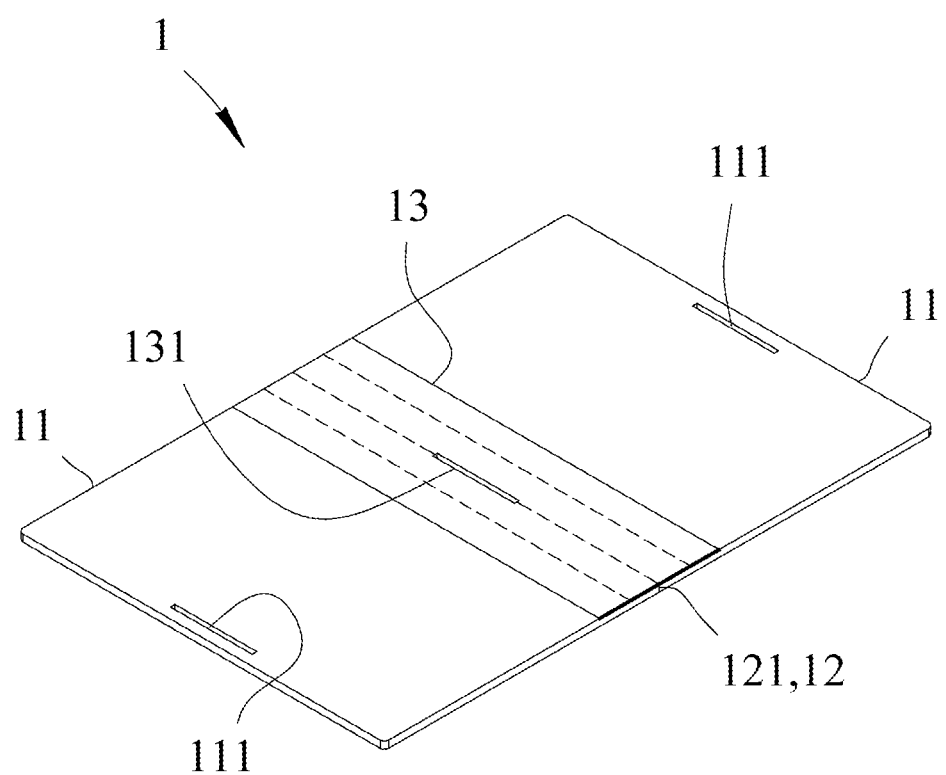
FIG. 4 is an exploded view of the second embodiment of the cutting mat assembly of the present invention.

As shown in FIGS. 3 and 4, the second embodiment of the present invention includes a connection piece 13 which is secured to the two mats 11 and covers the assembling line 12 by way of gluing or hot-pressing. The second handles 21 of the inner piece 2 extend through the first slots 111 of the two mats 11 to form the second embodiment of the cutting mat assembly "A". The users hold the second handles 21 to carry the cutting mat assembly "A" together with the tools stored by the inner piece 2.

Figure 5:
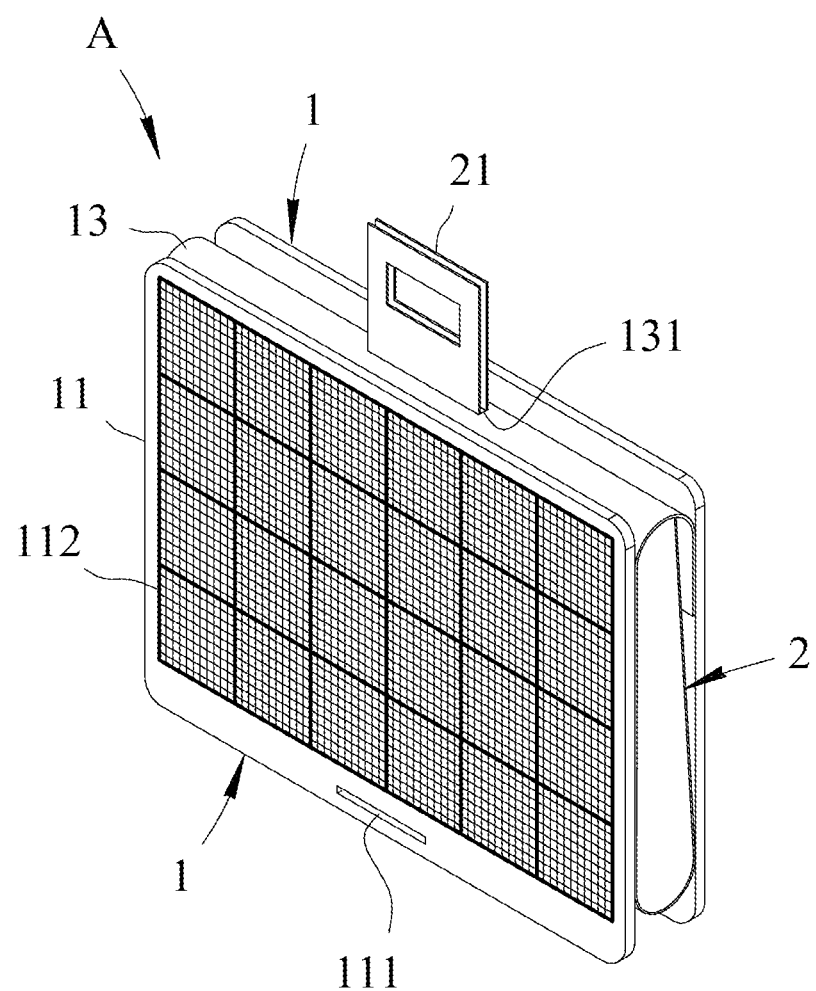
FIG. 5 is a perspective view to show the third embodiment of the cutting mat assembly of the present invention.

FIGS. 4 and 5 show the third embodiment of the present invention, wherein the connection piece 13 includes a third slot 131 formed in the middle portion thereof. The second handles 21 extend through the third slot 131 of the connection piece 13, so that the two mats 11 are located corresponding to one surface of the inner piece 2.

The cutting mat assembly "A" as disclosed in FIGS. 6 and 7 is the fourth embodiment of the present invention, the assembling line 12 is the continuous wave-shaped line 123. The two second handles 21 of the inner piece 2 respectively extend through the two first slots 111 such that the two mats 11 are located corresponding to one face of the inner piece 2.

Figure 9:
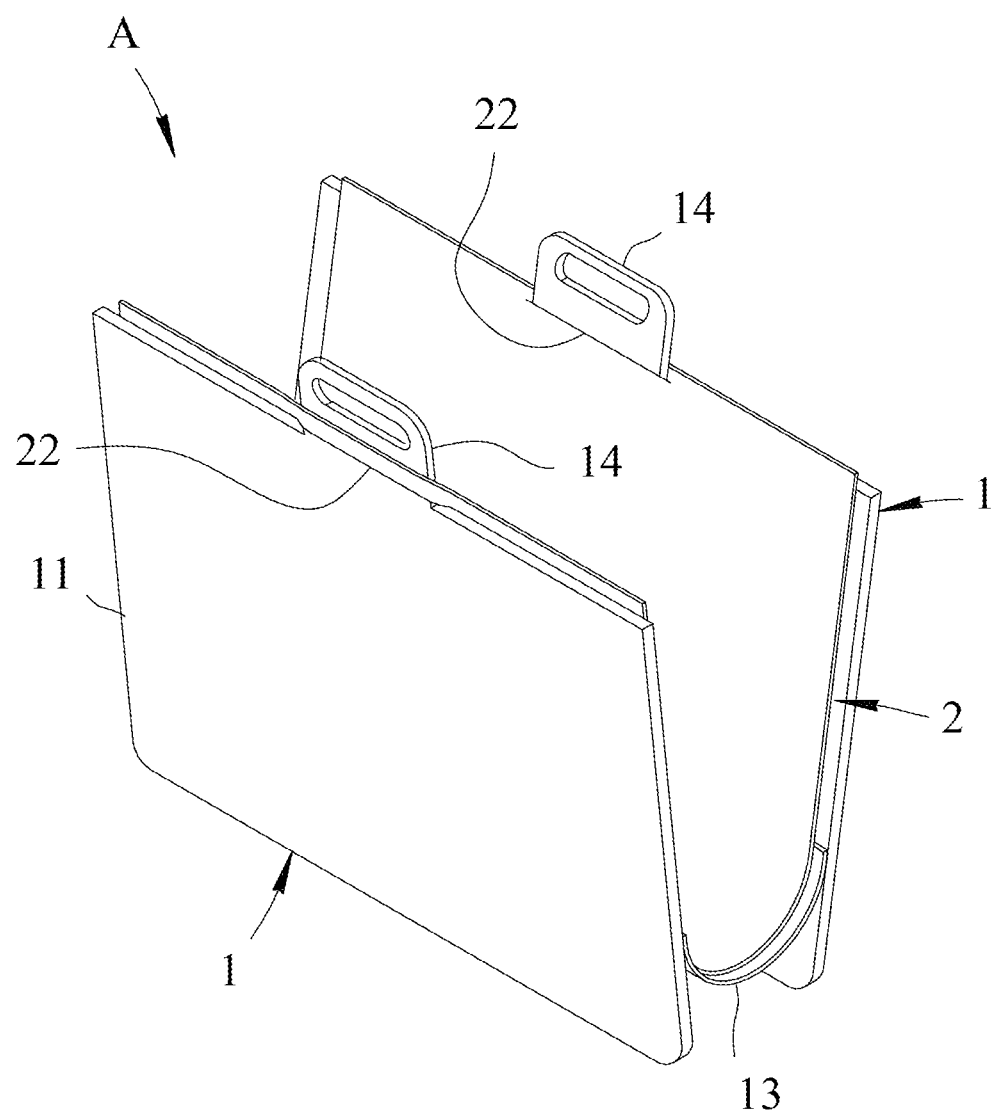
FIG. 9 is a perspective view to show the fifth embodiment of the cutting mat assembly of the present invention.

As shown in FIG. 9 which discloses the fifth embodiment of the present invention, wherein a second slot 22 is formed to each of two opposite ends of the inner piece 2. Each mat 11 includes a first handle 14 formed to the second side thereof. The first handles 14 of the two mats 11 respectively extend through the two second slots 22 of the inner piece 2.

Figure 10:
FIG. 10 shows the steps of the method for making the cutting mat assembly of the present invention.
Figure 10:

As shown in FIG. 10, the method "B" for making the cutting mat assembly "A" includes the following steps:

A step of assembling mats, wherein two mats 11 are arranged to be side-by-side, so that two respective first sides of the two mats 11 contacting each other. An assembling line 12 is formed along the two respective first sides of the two mats 11. Each mat 11 includes a first slot 111 or a first handle 14 formed to a second side thereof.

A step of forming an inner piece wherein the inner piece 2 is located between the two mats 11. A second slot 22 or a second handle 21 is formed to each of two opposite ends of the inner piece 2. The first handles 14 of the two mats 11 respectively extend through the two second slots 22 of the inner piece 2, or the two second handles 21 of the inner piece 2 respectively extend through the two first slots 111, such that the two mats 11 are located corresponding to one face of the inner piece 2.

A step of connecting a connection piece 13, wherein the connection piece 13 is secured to the two mats 11 and covers the assembling line 12.

Preferably, the assembling line 12 is a straight line 121, a curved line 122 or a continuous wave-shaped line 123.

Preferably, the connection piece 13 is secured to the two mats 11 and covers the assembling line 12 by way of gluing or hot-pressing.

Preferably, the connection piece 13 includes a third slot 131 formed in the middle portion thereof.

While we have shown and described the embodiment in accordance with the present invention, it should be clear to those skilled in the art that further embodiments may be made without departing from the scope of the present invention.

What is claimed is:

1. A method for making a cutting mat assembly, comprising: a step of assembling mats: arranging two mats side-by-side, two respective first sides of the two mats contacting each other, an assembling line formed along the two respective first sides of the two mats, each mat including a first slot or a first handle formed to a second side thereof, and a step of forming an inner piece located between the two mats, a second slot or a second handle formed to each of two opposite ends of the inner piece, the first handles of the two mats respectively extending through the two second slots of the inner piece, or the two second handles of the inner piece respectively extending through the two first slots such that the two mats are located corresponding to one face of the inner piece.

2. The method as claimed in claim 1, wherein the assembling line is a straight line, a curved line or a continuous wave-shaped line.

3. The method as claimed in claim 1 further comprising a step of connecting a connection piece, wherein the connection piece is secured to the two mats and covers the assembling line.

4. The method as claimed in claim 3, wherein the connection piece includes a third slot formed therethrough.

* * * * *